July 1, 1969  E. S. L. SVENSSON  3,452,523
LAWNMOWERS

Filed May 24, 1966  Sheet 1 of 2

INVENTOR
Ernst Sture Lennart
Svensson

BY Watson, Cole, Grindle + Watson
ATTORNEYS

United States Patent Office 3,452,523
Patented July 1, 1969

3,452,523
LAWNMOWERS
Ernst Sture Lennart Svensson, Malmo, Sweden, assignor to Flymo Societe Anonyme, Geneva, Switzerland
Filed May 24, 1966, Ser. No. 552,579
Claims priority, application Great Britain, May 29, 1965, 22,934/65
Int. Cl. A01d 35/26
U.S. Cl. 56—25.4     4 Claims

ABSTRACT OF THE DISCLOSURE

A lawnmower of the type having an internal combustion engine, a cutter drivably connected to said engine, an air impeller drivably connected to said engine, and air intake means for said engine having an induction opening located in the air current produced by said air impeller and constructed to withdraw induction air from said air current at a sharp change of direction of flow.

---

This invention relates to lawnmowers of the kind comprising an internal combustion engine, a cutter drivably connected to said engine, an air impeller drivably connected to said engine and constructed to produce an air current amounting in any period to more than three times the amount of induction air drawn into said engine in the same period.

In a lawnmower of the kind referred to the said air current may be used for one or more purposes, for example to cool the engine, to remove the grass cuttings, or to produce a cushion of air to support some or all of the weight of the mower.

Usually the engine induction air in mowers of the kind referred to is drawn through air filters. Often such air filters become clogged so that the engine loses power, and the operators may fail to clean or maintain the filters properly or may even remove the filters so that the engine becomes damaged by grit or other foreign matter drawn in with the induction air.

It is the object of the invention to provide an improved lawnmower of the kind referred to arranged to obviate or reduce the entrainment of foreign matter in the engine induction air.

With this object in view, according to the invention, a lawnmower of the kind referred to, in addition to the elements above recited, comprises air intake means for said engine having an induction opening located in the air current produced by said air impeller and constructed to withdraw induction air from said air current at a sharp change of direction of flow.

Further and optional features of the invention appear from the following description and the appended claims.

Figure 1:
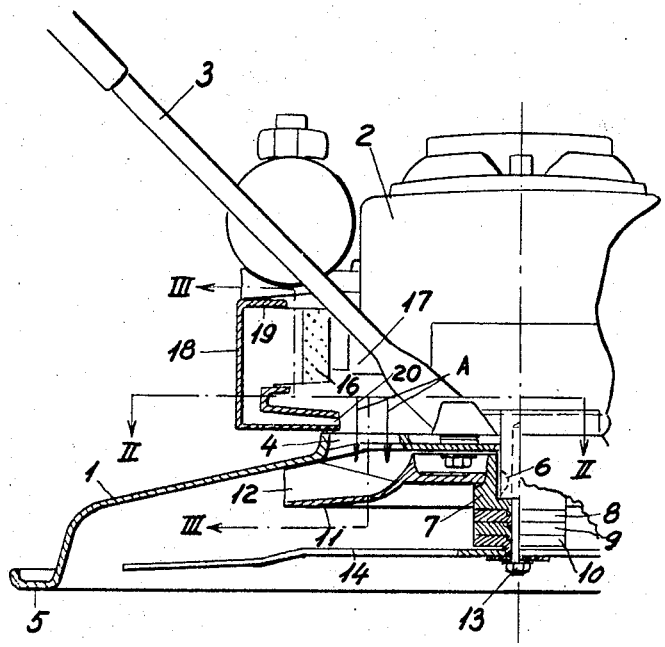
Figure 2:
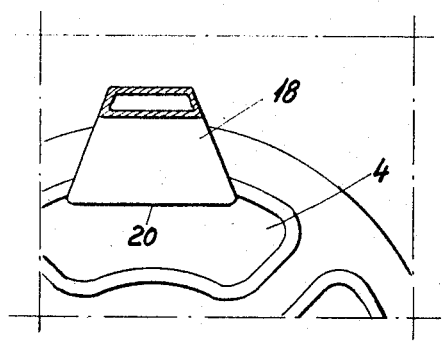
Figure 3:
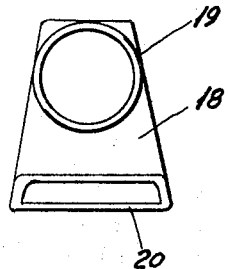
Figure 4:
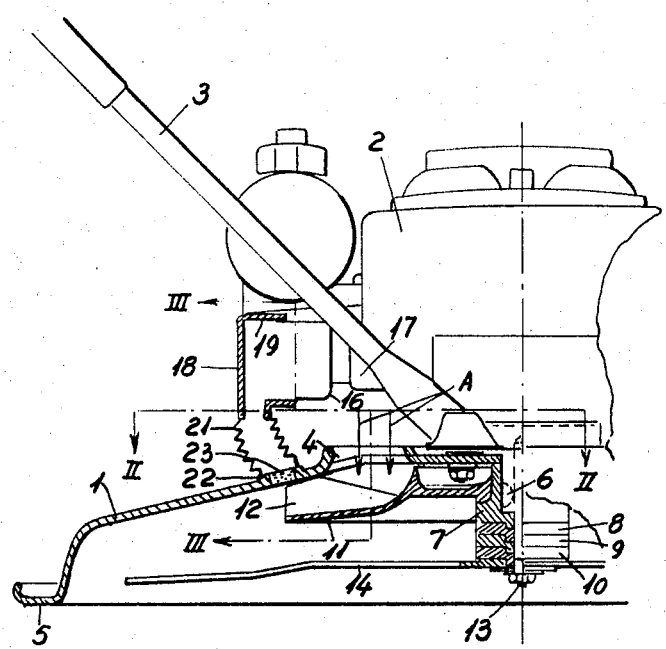

The invention is illustrated by way of example in the accompanying drawings, in which FIG. 1 is a partial elevation partly in vertical section of a mower in accordance with the invention, FIG. 2 is a detail view in section on the line II—II in FIGURE 1, FIG. 3 is an elevation of an air duct viewed as indicated by the line III—III in FIGURE 1, and FIG. 4 is a partial elevation partly in vertical section of another embodiment of a mower in accordance with the invention.

The lawnmower illustrated in FIGURE 1 comprises a hood 1 which serves as a chassis for the mower. An internal-combustion engine 2 is mounted on the hood 1 which is also provided with a pivotally-mounted handle 3. The hood 1 has an air intake opening 4 near its top and a rim flange 5 at its bottom. The engine 2 has a shaft 6 which carries four discs 7, 8, 9 and 10. The disc 7 supports an air-impeller comprising a disc shaped bottom part 11 and a number of substantially radially-extending wings 12 mounted on the upper side of the part 11. Between the lower disc 10 and a bolt 13 is clamped a cutter 14 of a type often used in rotary lawn mowers. One or both of the discs 8 and 9 may be removed for adjusting the cutting height.

The illustrated mower works as follows:

After the start of the engine the air-impeller 11, 12 will generate an air pressure in the chamber limited by the hood 1 and the ground on which the rim flange is resting. As soon as the air pressure thus generated creates an upwardly-directed force to overcome the weight of the mower the hood 1 will be raised from the ground sufficiently to allow movements of the mower substantially without resistance in any direction on the lawn.

The air-impeller 11, 12 produces an air current which amounts in any period to more than three times (usually many more times) the amount of induction air drawn into the engine 2 in the same period. The principal direction of the said air current entering the intake opening 4 is indicated by the arrows A.

The internal-combustion engine 2 is provided with a conventional induction air filter housing 16 attached to the carburetor 17. A duct 18 is provided with a tubular flange 19 detachably connected to said air filter housing 16 and has a rectangular induction opening 20 located substantially in a plane parallel to the principal direction of the air current entering the air intake opening 4 in the hood 1 as indicated by the arrows A.

Thus the engine induction air is withdrawn from the said air current and sharply changes direction in leaving said air current and entering the induction opening 20. In this way it is ensured that nearly all dirt, dust, grass clippings and other particles carried by the air current indicated by the arrows A will remain in this air current whereas substantially clean air only is withdrawn and passed to the combustion engine.

As a consequence, the air filter in the conventional filter housing 16 may be made thinner than usual or it may even be dispensed with.

The induction opening 20 is of elongated substantially rectangular or quadrilateral shape with a length more than twice its width, the width being in the principal direction of the air current passing the opening.

The duct 18 may be made of any suitable material, for example synthetic plastics material or metal, and it may fit frictionally on the housing 16 or be detachably or permanently connected to the housing 16 or even be formed integrally with the housing 16.

The embodiment of the invention according to FIG. 4 differs from the embodiment shown in FIGURES 1–3 therein that the hood 1 is provided with a hole which is situated just above the periphery of the air-impeller 11, 12. A flexible hose 21 connects the duct 18 with a flange 22 surrounding the said hole in the hood 1. A filter element 23 is placed in the hole and is kept clean by the passing air current generated by the air-impeller 11, 12.

It will be understood that the invention is applicable to mowers other than those supported on air cushions when in operation and that various modifications may be introduced.

What I claim is:

1. A lawnmower comprising an internal combustion engine, a cutter drivably connected to said engine, an air impeller drivably connected to said engine, a hood means for said cutter and said air impeller having a top wall provided with an air intake opening, said air impeller constructed to produce an air current through said intake opening and under said hood means amounting in any period to more than three times the amount of induction air drawn into said engine in the same period, and air intake means for said engine including duct means extending from a filter housing on said engine and having an end portion providing an induction opening, the plane of the induction opening located in and parallel to the air current produced by said air impeller constructed to withdraw induction air from said air current at a sharp change of direction of flow thereby insuring that nearly all dirt, dust, grass clippings and other particles carried by the air current will remain therein, whereas substantially clean air only is withdrawn and passed to said combustion engine.

2. A lawnmower as in claim 1 in which said duct is detachably connected to said air filter housing.

3. A lawnmower as in claim 1 in which said induction opening of said duct is of elongated shape having a length more than twice its width, the intake direction of said opening being substantially perpendicular to the direction of flow of said air current in the zone of said opening.

4. For attachment to a lawnmower comprising an internal combustion engine, a cutter drivably connected to said engine, an air impeller drivably connected to said engine, a hood means for said cutter and said air impeller having a top wall provided with an air intake opening, said air impeller constructed to produce an air current through said intake opening and under said hood means amounting in any period to more than three times the amount of induction air drawn into said engine in the same period, a air intake duct element connectable at one end thereof to the normal air intake of said engine in a predetermined position and having an air induction opening at its other end, said element being so shaped that, when in said predetermined position, said air induction opening of said duct element is present in the current of air produced by said air impeller so as to permit withdrawal of induction air for said engine from said current of air at a sharp change of direction of flow thereby insuring that nearly all dirt, dust, grass clippings and other particles carried by the air current will remain therein, whereas substantially clean air only is withdrawn and passed to said combustion engine.

References Cited
UNITED STATES PATENTS

| | | | |
|---|---|---|---|
| 2,747,558 | 5/1956 | Kiekhaefer | 123—41.62 |
| 3,056,249 | 10/1962 | Shaw | 56—25.4 |
| 3,338,038 | 8/1967 | Camph | 56—25.4 |

HUGH R. CHAMBLEE, *Primary Examiner.*